United States Patent
Froment

(10) Patent No.: US 10,867,138 B2
(45) Date of Patent: Dec. 15, 2020

(54) ELECTRONIC PAYMENT TERMINAL WITH SINGLE-PIECE MAGNETIC CARD READING ELEMENT COMPRISING A SLIDING METAL BLADE, CORRESPONDING MOUNTING METHOD

(71) Applicant: INGENICO GROUP, Paris (FR)

(72) Inventor: Marion Froment, Loriol (FR)

( * ) Notice: Subject to any disclaimer, the term of this patent is extended or adjusted under 35 U.S.C. 154(b) by 0 days.

(21) Appl. No.: 16/333,069

(22) PCT Filed: Sep. 15, 2017

(86) PCT No.: PCT/EP2017/073277
§ 371 (c)(1),
(2) Date: Mar. 13, 2019

(87) PCT Pub. No.: WO2018/050819
PCT Pub. Date: Mar. 22, 2018

(65) Prior Publication Data
US 2019/0266364 A1   Aug. 29, 2019

(30) Foreign Application Priority Data
Sep. 15, 2016  (FR) ...................... 16 58662

(51) Int. Cl.
*G06K 7/08* (2006.01)
*G07F 7/08* (2006.01)
*G06K 13/06* (2006.01)

(52) U.S. Cl.
CPC ............. *G06K 7/087* (2013.01); *G06K 7/089* (2013.01); *G06K 13/06* (2013.01); *G07F 7/0873* (2013.01); *G07F 7/0886* (2013.01); *G06K 7/084* (2013.01)

(58) Field of Classification Search
CPC ................................. G06K 7/00; G06K 19/00
USPC ......................................... 235/449, 375, 435
See application file for complete search history.

(56) References Cited

U.S. PATENT DOCUMENTS

| | | | |
|---|---|---|---|
| 5,065,001 A | 11/1991 | Hennick et al. | |
| 5,331,139 A | 7/1994 | Lee | |
| 5,818,915 A * | 10/1998 | Hayes, Jr. | ........... H04M 1/0202 455/405 |
| 7,934,653 B2 | 5/2011 | Dubois | |

(Continued)

FOREIGN PATENT DOCUMENTS

| | | |
|---|---|---|
| FR | 2810018 A1 | 12/2001 |
| FR | 2875620 A1 | 3/2006 |

OTHER PUBLICATIONS

International Search Report dated Dec. 7, 2017 for corresponding International Application No. PCT/EP2017/073277, filed Sep. 15, 2017.

(Continued)

*Primary Examiner* — Edwyn Labaze
(74) *Attorney, Agent, or Firm* — David D. Brush; Westman, Champlin & Koehler, P.A.

(57) ABSTRACT

An electronic payment terminal has a casing which is formed by assembling an upper half-shell and a lower half-shell. The lower half-shell includes a magnetic-card-reading single-piece element that has a groove for the movement of a magnetic card so as to enable reading of a magnetic stripe of the magnetic card. The magnetic-card reading single-piece element has a metal sliding blade positioned at the bottom of the groove for movement of the magnetic card.

10 Claims, 5 Drawing Sheets

(56) References Cited

U.S. PATENT DOCUMENTS

Figure 3A:
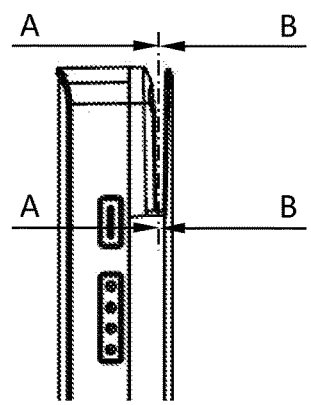

| | | | |
|---|---|---|---|
| 2011/0284636 A1* | 11/2011 | Kasai | G11B 5/00808 |
| | | | 235/449 |
| 2014/0162598 A1* | 6/2014 | Villa-Real | G06Q 20/4014 |
| | | | 455/411 |
| 2016/0027011 A1* | 1/2016 | Ninomiya | G06Q 20/3278 |
| | | | 705/75 |
| 2016/0034725 A1* | 2/2016 | Yasutomi | G06K 7/084 |
| | | | 235/380 |
| 2018/0278730 A1* | 9/2018 | Saeed | G06Q 20/204 |

OTHER PUBLICATIONS

Written Opinion of the International Searching Authority dated Dec. 7, 2017 for corresponding International Application No. PCT/EP2017/073277, filed Sep. 15, 2017.

English translation of Written Opinion of the International Searching Authority dated Dec. 15, 2017, for corresponding International Application No. PCT/EP2017/073277, filed Sep. 15, 2017.

\* cited by examiner

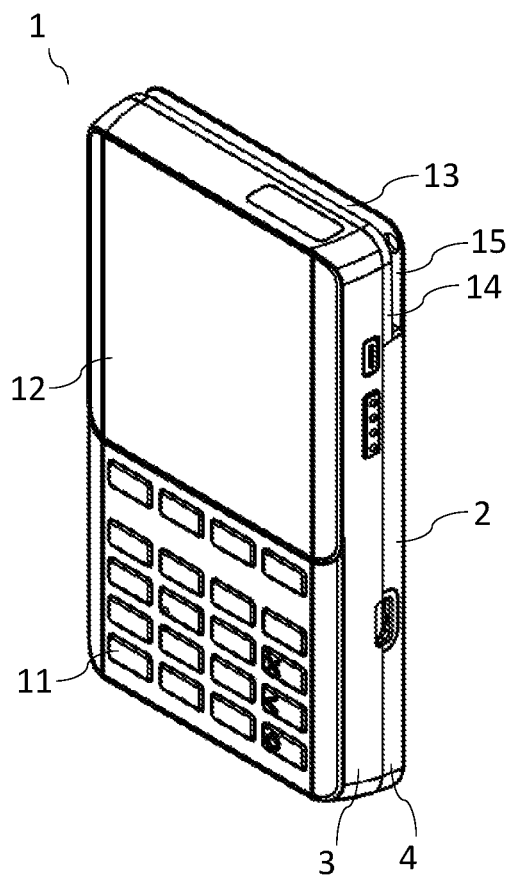
Fig. 1a
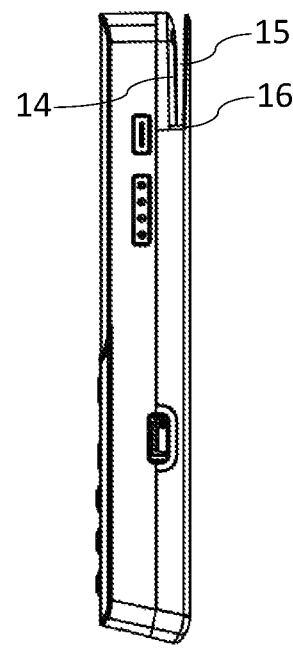
Fig. 1b
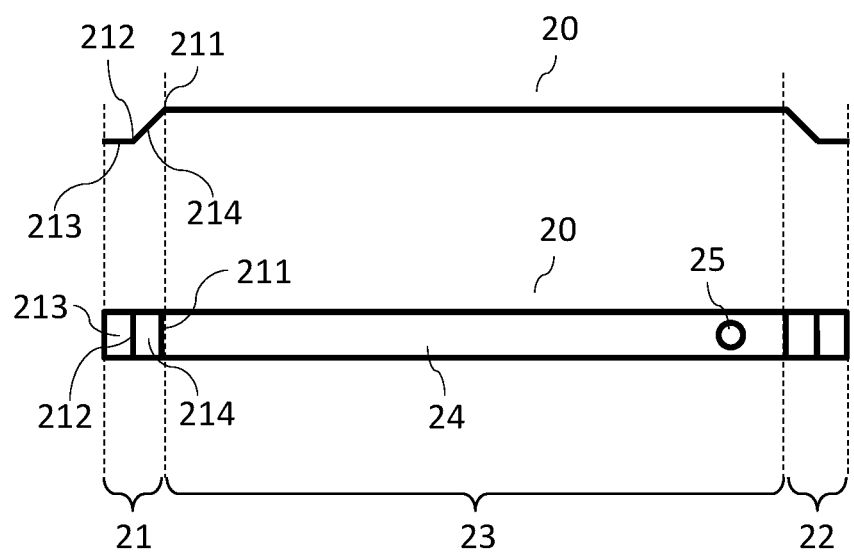
Fig. 2a
Fig. 2b

ELECTRONIC PAYMENT TERMINAL WITH SINGLE-PIECE MAGNETIC CARD READING ELEMENT COMPRISING A SLIDING METAL BLADE, CORRESPONDING MOUNTING METHOD

CROSS-REFERENCE TO RELATED APPLICATIONS

This Application is a Section 371 National Stage Application of International Application No. PCT/EP2017/073277, filed Sep. 15, 2017, which is incorporated by reference in its entirety and published as WO 2018/050819 A1 on Mar. 22, 2018, not in English.

1. FIELD OF THE INVENTION

The invention relates to the field of electronic payment terminals. More particularly, the invention relates to the field of electronic payment terminals comprising a magnetic card reader.

2. PRIOR ART

Electronic payment terminals are predominantly used to enable payment for purchases for goods and services at sales points. Such terminals generally comprise a smartcard reader and/or magnetic card reader. They also comprise a screen enabling especially the viewing of information, such as amounts of transactions, and a keypad for the entry of these very same amounts by the tradesmen as well as the entry of confidential codes by customers, or else they have a touchpad screen. An electronic payment terminal also comprises electronic components assembled in one or more secured enclosures. All these elements are contained in a casing, generally built out of an upper half-shell and a lower half-shell, fitted into each other and then fixedly attached by means of screws for example.

In many countries, the magnetic card (also known as a magnetic stripe card) continues to be a very widespread means of payment, and electronic payment terminals are therefore equipped with a magnetic-card reader used to read the information present in the magnetic stripe of a customer's magnetic card and thus enable payment to be made. Such a magnetic-card reader generally comprises a body made of plastic (integrated into one of the lower or upper half-shells, for example) having a groove intended for the movement of the magnetic card as well as a reading head mounted within this body. For various reasons (including reasons of cost, weight, etc.), the body of the magnetic card reader is generally made out plastic, and it is obtained by molding methods. These molding methods are especially worthwhile in that they enable the production of magnetic card reader bodies that have the nature of a single-piece element: the body of the magnetic card reader is then formed out of only one plastic piece. Thus, the costs are reduced by limiting the number of molds needed to produce card reader bodies and certain problems of assembly are overcome.

To make payment with his magnetic card, the user slides it into the groove of the magnetic-card reader. This groove for the movement of the magnetic card therefore acts as a guide so that, during the passage of the magnetic card in the reader, the magnetic stripe that it comprises is constantly facing the reading head. To this end, the bottom of the groove of the magnetic card reader serves as a support surface for the edge of the magnetic card during the sliding operation.

When the bottom of the groove of the magnetic-card reader is made of plastic, repeated friction caused by the sliding of the magnetic cards leads to gradual wear and tear of the bottom of the groove. Ultimately, this wear and tear is such that the magnetic stripe of a magnetic card passed into the reader is no longer accurately aligned with the magnetic-card head. This results in defects of reading of the information carried by the magnetic stripe, and the electronic payment terminal must be repaired or replaced.

One solution to this problem consists of the use of a metal blade as a supporting surface for the sliding of the magnetic card. Such a metal blade indeed withstands wear and tear, prompted by the repeated passage of magnetic cards, more efficiently than does plastic. The magnetic-card reader equipped with a metal blade can thus see its service life extended to more than 500,000 card insertions as against 200,000 when the bottom of the groove for the movement of the card is made out of plastic (even charged plastic). When this solution consisting in using a metal blade is chosen, the plastic body of the magnetic card reader is not formed out of a single piece: it thus generally comprises at least two plastic parts of substantially rectangular shapes and substantially equal dimensions, intended to be assembled facing each other so as to form the walls of the groove for the moving of the magnetic card. The metal blade forming the bottom of the groove is then installed between these two plastic parts during the assembling of the reader (in other words, the metal blade is sandwiched between the two plastic parts). This two-part design of the body of the magnetic-card reader nevertheless has a certain number of drawbacks (especially as compared with the single-piece design in which the body of the magnetic-card reader is formed as only one plastic piece). In addition to the problems of assembly inherent in a design comprising several parts, such a design necessitates the use of additional molds, giving rise to higher production costs for the magnetic-card reader. Besides, a design comprising several parts does not achieve the same degree of compactness as a single-piece type design: it is therefore ill-suited to the requirements of present-day users who are asking for increasingly compact devices. Finally, the fact that the magnetic-card reader results from an assembly of plastic parts makes it more vulnerable to fraud: there is always a risk that a malicious person will succeed in dismantling it to introduce a fraudulent device enabling him to retrieve information from the magnetic cards of customers (conversely, a single-piece type body of a magnetic-card reader cannot be dismantled, and must therefore be broken by the malicious individual, making fraud much more easy to detect).

The over-molding of a plastic single-block body of a magnetic-card reader directly on the metal blade could be envisaged but such a technique requires great precision of implementation and proves to be very costly.

None of the present-day solutions is therefore ideal and there is a need for electronic payment terminals equipped with magnetic-card readers that respond simultaneously to several requirements of the market and of users, namely payment terminals that are more compact, less costly to produce but nevertheless offer increased guarantees in terms of security against fraud and guarantees in terms of service life.

3. SUMMARY OF THE INVENTION

The invention does not have at least some of these prior-art drawbacks. Indeed, the invention proposes an electronic payment terminal, the casing of which is formed by the assembling of an upper half-shell and a lower half-shell, and the lower half-shell comprises a magnetic-card reading single-piece element itself comprising a groove for the movement of a magnetic card so as to enable the reading of a magnetic stripe of the magnetic card. According to the proposed technique, this magnetic-card reading single-piece element comprises a metal sliding blade positioned at the bottom of said groove for movement of the magnetic card.

In this way, the magnetic-card reading single-piece element of the electronic payment terminal offers increased resistance to wear and tear prompted by the repeated sliding of magnetic cards in the movement groove, through the mounting of a metal sliding blade at the bottom of the groove for movement of a magnetic card. In this way, the single-piece character of the magnetic-card reading body is also preserved: not only does the electronic payment terminal have increased service life (in terms of the numbers of times that cards can slide before wear and tear in the card reader creates card-reading problems), but this advantage is also obtained without detriment to the other advantages related to the use of a single-piece element as a magnetic-card reading body. Thus, the electronic payment according to the proposed technique also responds to requirements of users in terms of reduction of production costs, compactness and securing of transactions.

In one particular embodiment of the proposed technique, the bottom of the movement groove of said magnetic-card reading single-piece element comprises a recess within which said metal blade is fixed.

In this way, the recess made at the bottom of the groove forms a location within the magnetic-card reading single-piece element within which different components (electronic components of the magnetic card reader for example) can be installed before mounting the magnetic sliding blade.

According to one particular embodiment of the proposed technique, the metal sliding blade comprises a first affixing portion situated at one extremity of the blade, a second affixing portion situated at the other extremity of the blade and a substantially plane, central sliding portion situated between said first and second affixing portions.

In this way, the blade is shaped and sized so as to present holding means at the bottom of the groove, taking the form of the affixing portions. This prevents the need to resort to an overmolding of the single-piece element onto the metal sliding blade in order to hold this metal blade: thus, the single-piece element remains simple to produce and the need for an operation (overmolding) that requires very high precision and is generally costly is removed.

In one particular embodiment of the proposed technique, the magnetic-card reading single-piece element comprises, at the bottom of said groove, a first blocking cavity having a shape complementary to the first affixing portion of the metal sliding blade and a second blocking cavity having a shape complementary to that of the second affixing portion of the metal sliding blade.

In this way, the metal sliding blade can be held at the bottom of the groove by simple fitting together of the affixing portions of the blade in complementary blocking cavities made in the single-piece assembly. There is therefore no need to provide for additional affixing elements (such as screws for example) to hold the blade to the bottom of the groove. The designing of the magnetic-card reader is therefore simplified and the costs are thus also limited.

In one particular embodiment of the proposed technique, at least one of said first and second affixing portions of the metal sliding blade takes the form of a double folding of one extremity of said blade.

Thus, the affixing portions for the metal sliding blade are obtained in a simple, low-cost manner by simple folding of a metal blade which, initially, is substantially plane. The design of the ready-to-mount metal sliding blade is therefore simple and costs little.

In one particular embodiment of the proposed technique, said double folding of one extremity of the metal sliding blade comprises a first folding of the blade by an angle substantially equal to 45°, and a second folding of the blade by an angle substantially equal to 45° in a direction opposite that of the direction of said first folding.

In this way, the shape of the metal sliding blade enables not only easier introduction of affixing portions into the corresponding blocking cavities of the magnetic-card reading single-piece element but also efficient holding of the metal sliding blade in these blocking cavities once this blade is mounted.

According to another aspect, the proposed technique also relates to a method for mounting a metal sliding blade at the bottom of a magnetic-card movement groove of a magnetic-card reading single-piece element. The metal sliding blade comprises a first affixing portion situated at one extremity of the blade, a second affixing portion situated at the other extremity of the blade and a substantially plane, central sliding portion situated between said first and second affixing portions. According to the proposed technique, such a method comprises:

- a step for introducing said first affixing portion of the metal sliding blade into a first blocking cavity of said magnetic-card reading single-piece element;
- a step for exerting pressure on said blade by means of a tool for mounting the blade so as to reduce the distance between said first and second affixing portions by elastic deformation of the blade;
- a step for introducing said second affixing portion of the elastically deformed metal sliding blade into a second blocking cavity of said magnetic-card reading single-piece element by means of said mounting tool;
- a step for relaxing said exerted pressure, leading to the blocking of said second affixing portion in said second blocking cavity.

In this way, the mounting of the metal sliding blade in a groove, which is nevertheless narrow, of the magnetic-card reading single-piece element is an easy, speedy and low-cost operation. In particular, only one tool is needed to carry out this operation and the affixing of the metal sliding blade into the card reading single-piece element is done by simple cooperation of the portions for affixing the metal sliding blade into the complementary blocking cavities of the single-piece element. Thus, no third affixing means other than the blade itself or the single-piece element itself is needed to maintain the metal sliding blade at the bottom of the magnetic-card movement groove.

In one particular embodiment of the proposed technique, the metal sliding blade comprises an orifice, and the mounting tool comprises a point (also possibly referred to as a "pin") at one of its extremities capable of being inserted into said orifice.

In this way, the mounting tool, just like the metal sliding blade, remains very simple and low-cost in their design since the tool can be used in conjunction with the blade through a simple insertion of a point of the tool into an orifice of the blade.

In one particular embodiment of the proposed technique, the point extends perpendicularly to a first plane surface situated at said extremity of the mounting tool, at the boundary of a junction zone between said first plane surface and a second plane surface also situated at said extremity of the mounting tool, said first and second plane surfaces forming an angle between them of 135° to 170°.

Thus, while remaining simple and costing little, the design of the tool, by the orientation and position of the point and by the angle formed between the two plane surfaces with each other, by simple inclination of the mounting tool once the point is inserted into the corresponding orifice of the metal sliding blade, makes it possible to hold the blade with the tool. It also enables the very simple exertion of a lever effect on the blade in order to elastically deform it with a view to introducing the second portion for affixing the blade in the corresponding blocking element of the single-piece card-reading element (the metal sliding blade being furthermore already held by its other extremity—its first affixing portion—in the first blocking cavity of the card-reading single-piece element).

In one particular embodiment of the proposed technique, the point is chamfered at its free extremity.

In this way, the insertion of the point of the mounting tool into the orifice of the metal sliding blade is made easier.

In one particular embodiment of the proposed technique, the method of mounting comprises, subsequently to the mounting of the metal sliding blade into the bottom of the magnetic card movement groove, a step for mounting a magnetic-card reading head within said groove.

Thus, the mounting of the reading head within a movement groove of this magnetic card of the single-piece element does not hinder the operation for mounting the metal sliding blade, this operation having been performed beforehand.

The different embodiments mentioned here above can be combined with each other to implement the invention.

According to another aspect, the invention also independently pertains to a tool for mounting the metal sliding blade within the magnetic-card reading single-piece element.

4. LIST OF FIGURES

Figure 3B:
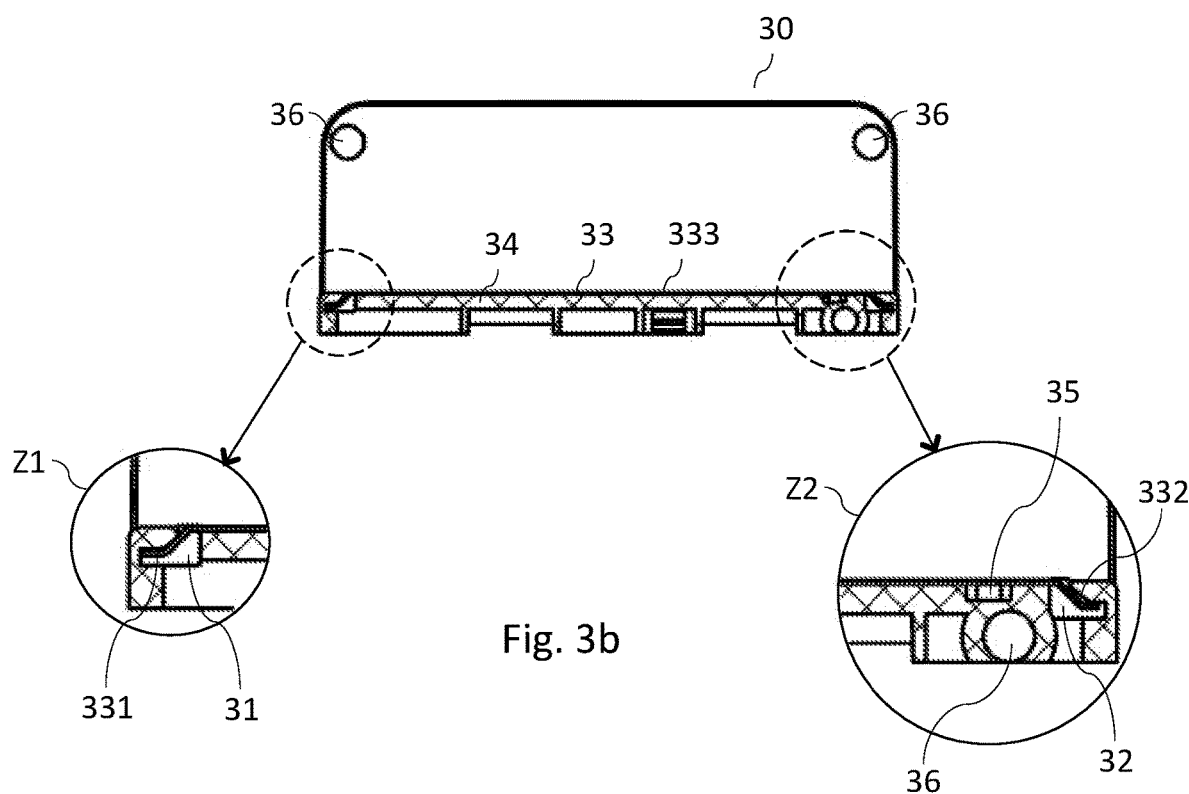
Figure 4:
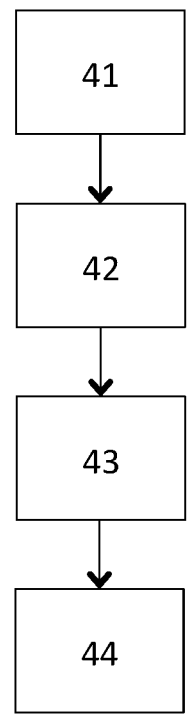
Figure 5:
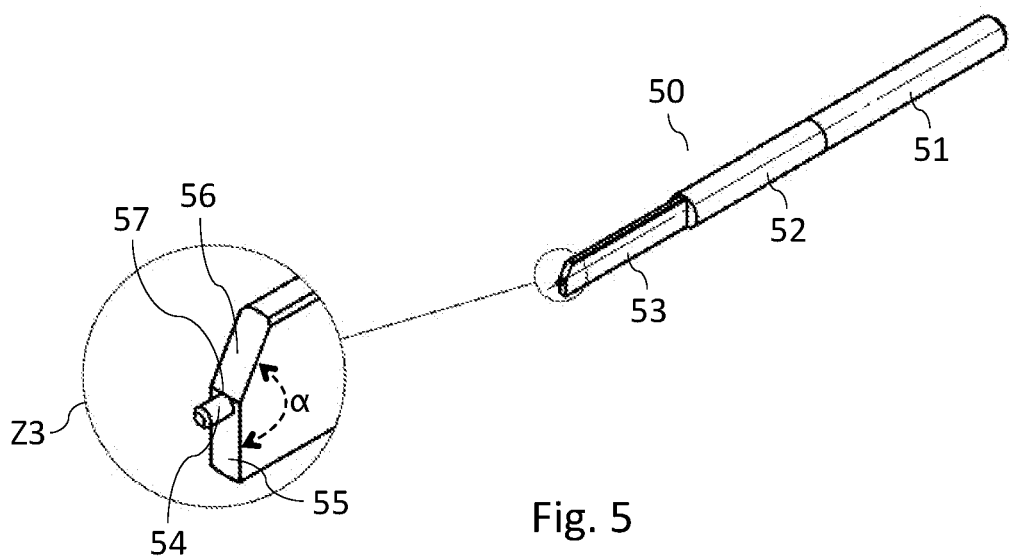
Figure 6A:
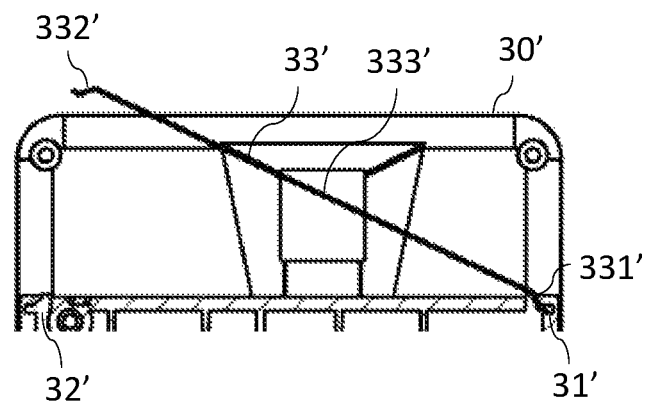
Figure 6B:
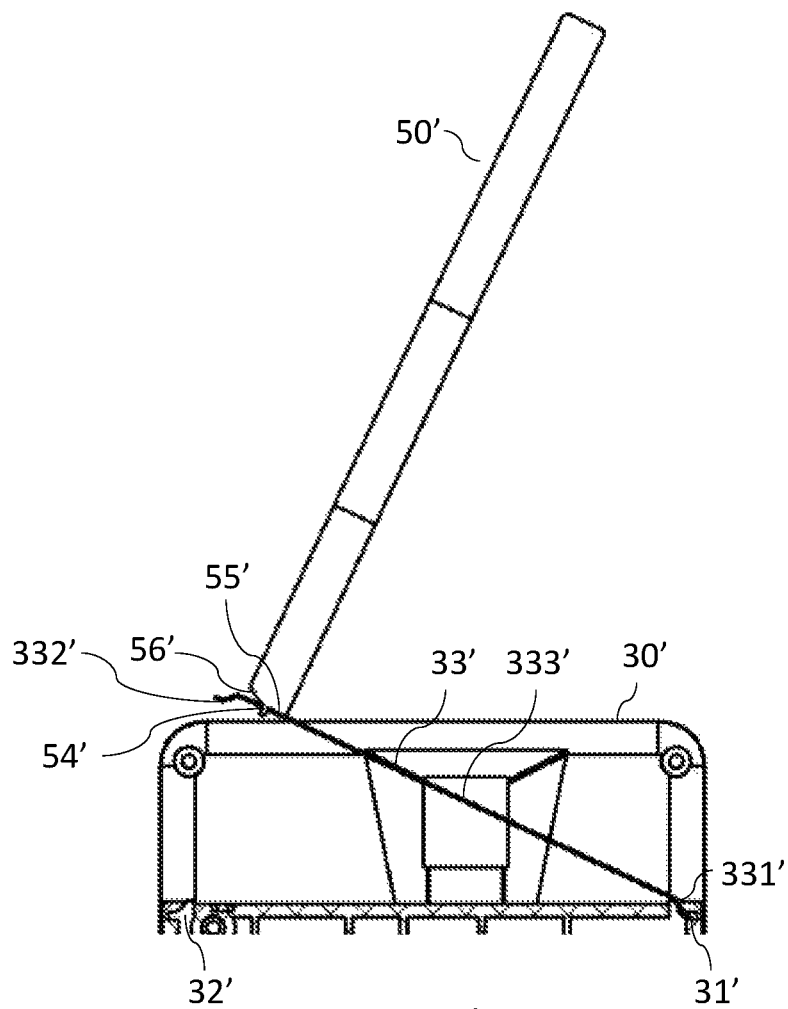
Figure 6C:
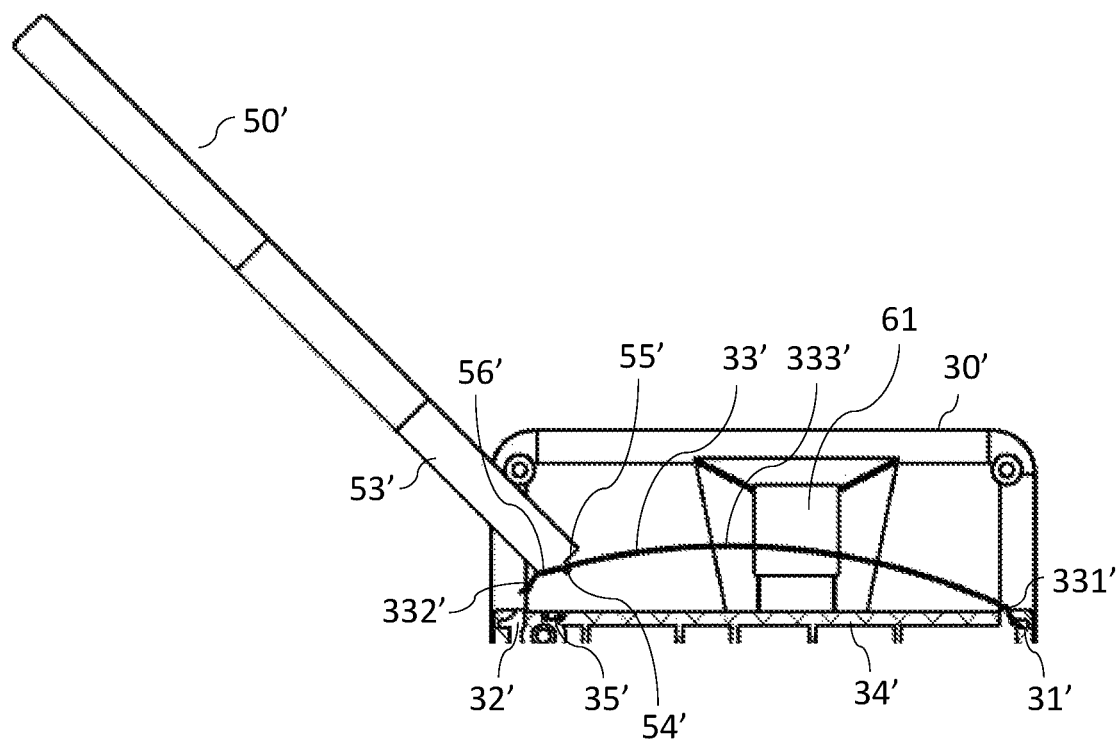

Other features and advantages of the invention shall appear more clearly from the following description of a preferred embodiment of the proposed technique, given by way of a simple, illustrative and non-exhaustive example and from the appended drawings of which:

FIGS. 1a and 1b respectively present a view in perspective (FIG. 1a) and a side view (FIG. 1b) of an electronic payment terminal according to one particular embodiment of the invention;

FIGS. 2a and 2b present a metal sliding blade seen from the front (FIG. 2a) and from the top (FIG. 2b), in one particular embodiment of the proposed invention;

FIG. 3b is a view in section of a magnetic-card reading single-piece element comprising a groove at the bottom of which there is positioned a metal sliding blade, along the section plane represented by the axis A-A presented with reference to FIG. 3a, in one particular embodiment of the proposed technique;

FIG. 4 describes the main steps of a method for mounting a metal sliding blade at the bottom of the groove of a magnetic-card reading single-piece element in one particular embodiment of the proposed technique;

FIG. 5 presents a view in perspective of a tool for mounting a metal sliding blade at the bottom of the groove of a magnetic-card reading single-piece element in one particular embodiment of the proposed technique;

FIGS. 6a to 6c illustrate the implementation of certain steps of the mounting method described in FIG. 4, in one particular embodiment of the proposed technique.

5. DESCRIPTION

In all the figures of the present document, the identical elements and steps are designated by one and the same reference number.

FIG. 1a represents an electronic payment terminal 1 in one particular embodiment of the proposed technique. This terminal 1 comprises especially a keypad 11, a screen 12 and a magnetic card reader 13 enabling the use of a magnetic stripe card to make payments. These different elements as well as the non-visible electronic components are grouped together in a casing 2 that is itself formed by an upper half-shell 3 assembled with a lower half-shell 4. The magnetic-card reader body 13 is formed by a magnetic-card reading single-piece element 14 within which a groove 15 is made for the movement of a magnetic card. The term "single-piece" element is understood to mean an element formed by only one piece, such as a plastic piece obtained for example by an injection-molding method. The groove 15 can be seen more clearly in FIG. 1b which shows a payment terminal according to the invention in a profile view. A part 16 of the magnetic-card reading single-piece element 14 especially forms the bottom of the groove 15. According to the general principle of the proposed technique, a metal sliding blade is mounted at the bottom of the groove 15 for movement of a magnetic card of the single-piece element 14.

In this way, the magnetic-card reader of the electronic payment terminal offers increased resistance to the wear and tear prompted by the repeated sliding of the magnetic cards in the movement groove, inasmuch as the plastic bottom of this groove is in a way reinforced by the mounting of the metal sliding blade. Contrary to the prior-art solutions, this addition of a metal sliding blade according to the proposed technique is done without detriment to the advantages related to the use of a single-piece element as the body of the magnetic-card reader: with the proposed technique, the use of such a single-piece element is maintained and the electronic payment terminal not only has increased service life (in terms of number of times that cards can slide within it before wear and tear in the card reader causes card reading problems), but also meets the requirements of the users (tradesmen, banks) in terms of reducing production costs, compactness of the package and securing of transactions.

Referring to FIGS. 2a and 2b, we present an example of a metal sliding blade 20 that can be mounted within a magnetic-card reading single-piece element of an electronic payment terminal, in one particular embodiment of the proposed technique. The metal sliding blade 20 is represented in a front view (FIG. 2a) and top view (FIG. 2b). Such a metal sliding blade 20 comprises three distinct portions: a first affixing portion 21 situated at one extremity of the blade, a second affixing portion 22 situated at the other extremity of the blade and a central sliding portion 23—the upper face 24 of which is substantially plane—situated between said first and second affixing portions (21, 22). The term "upper face 24 of the central sliding portion 23" is understood to mean the face of this portion that can be seen when the metal sliding blade 20 is seen from the top, as represented in FIG. 2b. This upper face 24 of the central sliding portion 23 seeks to serve as a support surface for the edge of a magnetic card during the sliding of such a card in the groove for moving of the magnetic-card reading single-piece element, with a view to the reading of a magnetic stripe of the magnetic card. The first and second affixing portions (21, 22) for their part serve to hold the metal sliding blade 20 at the bottom of the magnetic-card movement groove, as described here below with reference to FIGS. 3a and 3b. According to one particular characteristic of the proposed technique, the metal sliding blade also comprises, in its central sliding portion 23, an orifice 25 (for example a circular orifice). This orifice, the utility of which is described in detail here below, is preferably situated in the vicinity of either of the first and second affixing portions (21, 22).

FIG. 3b shows a view in section of a magnetic-card reading single-piece element 30 comprising a groove at the bottom of which there is positioned a metal sliding blade 33, in one particular embodiment of the proposed technique. This view in section is drawn along the section plane represented by the axis A-A presented with reference to FIG. 3a (this FIG. 3a corresponds to a truncated view of FIG. 1b, representing the upper part of an electronic payment terminal seen in profile, in one particular embodiment of the proposed technique). The section is therefore made in the axis of the groove. To facilitate the reading of this FIG. 3b, it also comprises two magnified zones Z1 and Z2. This view in section of the single-piece element shows two blocking cavities (31, 32) that take the form of recess areas made in the part 34 of the single-piece element forming the bottom of the groove. The first blocking cavity 31 has a shape complementary to the first affixing portion 331 of the metal sliding blade 33, and the second blocking cavity 32 has a shape complementary to the second affixing portion 332 of the metal sliding blade 33. The affixing portions (331, 332) of the metal sliding blade 33 and the corresponding blocking cavities (31, 32) of the magnetic-card reading single-piece element 30 are shaped and sized to cooperate and enable the holding of the metal sliding blade of the bottom of the groove, once this blade is mounted. The central sliding portion 333 of the metal sliding blade 33 then rests, over a major part of its length, on the part 34 of the single-piece element forming the bottom of the groove. It thus offers a very stable support surface during the sliding of the edge of a magnetic card with which it is desired to carry out the reading. When the blade is mounted, the characteristics of the metal sliding blade and of the blocking cavities are such that the upper face of the central sliding portion 333 is flush with, or slightly raised relative to, the portions of the part 34 forming the upper walls of the blocking cavities so that there is no obstacle whatsoever to the sliding of the magnetic card. The metal character of the blade 33 also favors the sliding of the magnetic card while offering increased resistance to wear and tear as compared with the solution where the sliding is done directly on the plastic part 34 of the single-piece element forming the bottom of the groove. According to one particular characteristic of the proposed technique, a hole 35 can also be made in the part 34 forming the bottom of the groove. This hole 35, the utility of which is described in detail here below, is positioned so that it gets placed before the orifice made in the central sliding portion 333 of the metal sliding blade 33 once this blade is mounted at the bottom of the groove (the metal sliding blade is then considered to effectively include an orifice such as the orifice 25 already described with reference to FIG. 2b).

In another particular embodiment (not shown), the part 34 of the single-piece element forming the bottom of the groove comprises a recess within which the metal blade is affixed. In this case, the central sliding portion 333 of the metal sliding blade 33 does not necessarily rest on the part 34 of the single-piece element once it is mounted: on the contrary, it covers the recess in which it is fixed: the metal sliding blade 33 is then held by its affixing portions in corresponding blocking cavities of the part 34 made on either side of the recess. Such a recess can for example serve as a location for the installation of complementary components (for example electronic components) associated with the magnetic card reader before the mounting of the metal sliding blade.

In one particular embodiment, the magnetic-card reading single-piece element 30 also comprises orifices 36 enabling the passage of screws and screwing tools used for assembling the electronic payment terminal (these orifices 36 are for example needed for assembling the single-piece magnetic-card reader element 30 with the lower half-shell of the electronic payment terminal or for assembling lower and upper half-shells of the electronic payment terminal).

Referring again to FIGS. 2a and 2b, we present a few particular characteristics of the metal sliding blade 20 in particular embodiments of the proposed technique.

According to one particular characteristic, at least one of said first and second affixing portions (21, 22) of the metal sliding blade 20 take the form of a double fold of one extremity of said blade. It is thus possible to very simply form an affixing portion from a simple metal blade that is initially flat and takes the form of an appreciably rectangular metal plate of small width and small thickness, by folding its extremities. In the example of FIGS. 2a and 2b, each extremity of the blade has thus been folded twice so as to form the affixing portions 21 and 22. For example, the first affixing portion 21 results from a first folding of the blade along the folding axis 211 and a second folding of the blade along the folding axis 212 (whence the term "double fold" used in the present description). The affixing portions are thus obtained in a particularly simple and low-cost manner and the metal sliding blade is itself of very simple design inasmuch as it initially takes a basic shape (a simple rectangle of thin metal). According to one particular characteristic of the technique for obtaining an affixing portion described here above, the double folding implemented comprises a first folding of the blade by an angle substantially equal to 45° and a second folding of the blade by an angle substantially equal to 45° in a direction opposite a direction of said first folding. The free extremity 213 of the affixing portion 21 thus formed is then appreciably parallel to the central sliding portion 23 of the blade while being connected to it by a joining portion 214 having an inclination substantially equal to 45°. This particular structure of an affixing portion has a twofold advantage: firstly that of enabling easier insertion into a corresponding blocking cavity of the single-piece magnetic-card reading element (owing to the "average" 45° inclination of the junction portion 214) and secondly that of efficiently holding the blade once it is mounted (through the parallelism between the free extremity 213 of the affixing portion 21 and the central sliding portion 23 which causes this free extremity 213 to offer major resistance to the withdrawal of the mounted metal sliding blade when it abuts an upper wall of the blocking cavity that receives it).

We shall now look at the method for mounting a metal sliding blade at the bottom of the groove for movement of the magnetic card of a magnetic-card reading single-piece element. As already described here above with reference to FIG. 2, the metal sliding blade comprises a first affixing portion situated at one extremity of the blade, a second affixing portion situated at the other extremity of the blade and a substantially plane, central sliding portion situated between said first and second affixing portions.

FIG. 4 illustrates the main steps of such a mounting method in one particular embodiment. In a first step 41, the first affixing portion of the metal sliding blade is introduced into a first blocking cavity of the magnetic-card reading single-piece element. Since the length of the metal sliding blade is greater than the height of the groove, this operation can be carried out without particular tools: it is enough to hold the metal sliding blade by one extremity and guide the first affixing portion present at the other extremity of the blade in the groove until it is introduced into a first complementary blocking cavity of the magnetic-card reading single-piece element. The first affixing portion and the first blocking cavity are shaped and sized so that this operation is made easier if the metal sliding blade is presented at a certain angle (for example the angle formed between the metal sliding blade and the bottom of the groove must range from 25° to 55° so that the first affixing portion of the blade can be completely introduced into the first blocking cavity of the single-piece element). Then, in a step 42, a pressure is exerted on the metal sliding blade by means of a tool for mounting the blade. This pressure force is exerted on the metal blade in a vicinity of the second affixing portion of the blade which, unlike the first affixing portion, is not yet blocked in its blocking cavity (the second blocking cavity). The pressure force is applied appreciably towards the first affixing portion, blocked in the first blocking cavity, and this has the effect of reducing the distance between the first and second affixing portions of the blade by elastic deformation of the metal sliding blade. While maintaining the pressure force on the blade, the mounting tool is then used in a step 43 to guide and introduce the second affixing portion of the elastically deformed metal sliding blade into a second blocking cavity of the magnetic-card reading single-piece element. The mounting tool comprises, to this end, a part that is thin enough to be inserted into the groove of the magnetic-card reading single-piece element. Finally, in a step 44, the pressure force, which until then had continued to be exerted, is released. The blade then tends to resume its initial shape leading to the blocking of the second affixing portion in the second blocking cavity. The mounting tool can, if necessary, be used to press on the central sliding portion of the blade so as to finalize the mounting in making sure that the affixing portions are properly pushed to the bottom of their respective blocking cavities. The first and second affixing portions of the metal sliding blade are then respectively blocked in the first and second blocking cavities of the magnetic-card reading single-piece element, and the central sliding portion of the blade rests on the bottom of the groove: the mounting of the metal sliding blade—now blocked at the bottom of the groove—is then terminated, and the mounting tool can be withdrawn.

In one particular embodiment, the mounting method according to the proposed technique comprises, subsequently to the mounting of the metal sliding blade at the bottom of the magnetic-card movement groove, a step for mounting a magnetic-card reading head within the groove. By proceeding in this order, the mounting of a magnetic-card reader is made easier inasmuch as the reading head—mounted afterwards—cannot therefore cause a hindrance (for example a hindrance to the passage of the blade or to the passage of the mounting tool) during the installation of the metal sliding blade in the bottom of the groove of the single-piece element forming the body of the reader.

Referring to FIG. 5, we present an example of a mounting tool 50 that can be used for the mounting of a metal sliding blade at the bottom of the magnetic card movement groove in one particular embodiment. This mounting tool 50 comprises a sleeve 51, a part 52 of the surface of which is, if necessary, threaded so that it can be more easily gripped. It also comprises a portion 53 of narrowed thickness that extends in the prolongation of the sleeve 51. This portion 53 of narrowed thickness is thin enough to be capable of insertion into the groove of a magnetic-card reading single-piece element (in other words, the thickness of the portion 53 of narrowed thickness is smaller than the distance between the two walls of the groove, and it is for example substantially equal to the width of the metal sliding blade that must be installed in the groove). The portion 53 of narrowed thickness is also long enough to make it possible, in at least one position of the use of the tool, to comfortably reach either of the blocking cavities of the magnetic-card reading single-piece element with its free extremity (in other words the length of the portion 53 of narrowed thickness is for example greater than the depth of the groove). The area Z3 of FIG. 5 presents a magnified view of the free extremity of the portion 53 of narrowed thickness which corresponds to the working extremity of the mounting tool 50. The mounting tool 50 comprises, at this working extremity, a point 54 intended for insertion into a complementary hole of the metal sliding blade to be mounted (the orifice 25 described here above with reference to FIG. 2b). In the example of FIG. 5, this point is cylindrical and intended to cooperate with a circular orifice of a diameter slightly greater than that of the point.

This example is not exhaustive: in other particular embodiments of the proposed technique, the point and the complementary orifice can take other forms. For example, the point can take the form of a rectangular parallelepiped intended for insertion into a rectangular-section orifice of the metal sliding blade (point and orifice can then be shaped and sized so as to limit the positions of insertion of the tool into the orifice of the blade at positions in which the portion 53 of narrowed thickness will be accurately oriented to enable its insertion into the groove of the single-piece element during the mounting of the blade for example).

In one particular embodiment of the mounting tool, the blade 54 is chamfered at its free extremity so as to facilitate its insertion into the complementary orifice of the metal sliding blade (such a chamfer is especially visible in the magnified view 23 of FIG. 5).

According to another particular characteristic of the mounting tool 50, the point 54 extends perpendicularly to a first plane surface 55 situated at the working extremity of the mounting tool 50, at the boundary of a junction zone 57 between the first plane surface 55 and a second plane surface 56 also situated at said working extremity of the mounting tool 50. According to one particular characteristic of the proposed technique, these first and second plane surfaces (55, 56) form an angle α, between them, ranging from 135° to 170°. This ingenious design of the mounting tool 50 makes it possible, by the orientation and position of the point 54 and by the angle formed by the two plane surfaces (55, 56) with each other, by simple inclination of the mounting tool 50, once the point 54 is inserted into the complementary orifice of a metal sliding blade, on the one hand to be able to hold the blade with the tool and, on the other hand, to be able to exert a lever effect on the blade enabling it to be elastically deformed. These characteristics appear clearly in FIGS. 6a to 6e which illustrate the way in which the mounting tool presented with reference to FIG. 5 can be used to implement certain of the steps of the mounting method described in FIG. 4 in order to mount, in a single-piece magnetic-card reading element, a metal sliding blade as presented with reference to FIGS. 2*a* and 2*b* in one particular embodiment.

FIGS. 6*a* to 6*c* present a magnetic-card reading single-piece element 30' seen in the section plane represented by the axis B-B indicated in FIG. 3*a*. A first affixing portion 331' of a metal sliding blade 33 is first of all introduced into a first blocking cavity 31' of the single-piece element 30' (FIG. 6*a*, corresponding to the implementation of the step 41 of the mounting method described with reference to FIG. 4). This operation can be carried out manually without tools in holding for example the metal sliding blade 33' by the extremity 332' corresponding to a second affixing portion of the blade. Once the first affixing portion 331' of the metal sliding blade 33' is completely engaged in the first blocking cavity 331' of the single-piece element 30' of the magnetic-card reading single-piece element 30', the point 54' of a mounting tool 50' is inserted into a corresponding orifice of the metal sliding blade 33' until the first plane surface 55' of the tool comes into contact with the central sliding portion 333 of the blade (FIG. 6*b*). It is then enough to incline the tool 50' about the junction zone between the first plane surface 55' and the second plane surface 56' towards the second plane surface 56' until the tool 50' alone is enough to hold the metal sliding blade: since the axis of the point is kept inclined relative to the axis of the orifice of the blade, this blade is so to speak "wedged" in the mounting tool 50' (the length and the diameter of the point as well as the diameter of the orifice of the blade are of course sized so that such a holding is possible). It is then possible to very simply exert pressure on the metal sliding blade by means of the mounting tool according to the step 42 of the mounting method described with reference to FIG. 4 to reduce the distance between the first and second affixing portions of the blade. To this end, it is enough to even further incline the mounting tool 50' about the junction zone between the first and second plane surfaces (55', 56') of the tool while exerting a thrust towards the first affixing portions 331' of the blade already held in its blocking cavity 31'. The lever affect then obtained by the joint action of the second plane surface 56 on the upper surface of the central sliding portion 333' of the blade on the one hand and the point 54' on the lower surface of the central sliding portion 333' of the blade on the other hand, accompanied in addition by the thrust exerted towards the affixing portion 331' of the blade already held in the first blocking cavity 31', leads to the elastic deformation of the blade (FIG. 6*c*). This operation is further facilitated by the fact that the orifice for inserting the point 54' is then situated in the neighborhood of an affixing portion of the metal sliding blade, i.e. close to one extremity of the blade: the pressure to be exerted to deform it is therefore lower. Then, the mounting tool 50' is used to guide the second affixing portion 332' of the elastically deformed metal sliding blade until it is introduced into the second blocking cavity 32' of the single-piece element 30 (step 43 of the mounting method described with reference to FIG. 4). The portion 53 of narrowed thickness of the tool makes this operation possible because it is fine enough to enable insertion into the groove of the magnetic-card reading single-piece element 30'. The pressure exerted on the metal sliding blade 33' can then be relaxed (step 44 of the mounting method described with reference to FIG. 4), especially by putting upright the mounting tool 50', i.e. in inclining it about the junction zone between the first plane surface 55' and the second plane surface 56' but this time towards the first plane surface 55'.

We then note the utility of the hole 35' made according to one particular characteristic of the proposed technique in the part 34' of the single-piece element forming the bottom of the groove. This hole 35' indeed makes it possible to receive the point 54' of the mounting tool at the end of mounting of the metal sliding blade into the bottom of the groove of the single-piece element during or after the introduction of the second affixing portion of the blade into the second blocking cavity of the single-piece element (in other words, during the steps 43 or 44 of the mounting method described with reference to FIG. 4). The hole 35' is wide enough and deep enough to receive the point 54' at different inclinations. Thus, the point 54' never abuts the part 34' forming the bottom of the groove during these operations at the end of mounting and it does not hinder their efficient progress. In addition, once the point 54' is positioned in the hole 35', the first and second plane surfaces (55', 56') of the mounting tool can serve as useful surfaces to exert a supporting force on the metal sliding plate and thus finalize its right positioning (by ensuring especially the complete introduction of the second affixing portion 332' of the metal sliding blade 33' into the second blocking cavity 32' of the single-piece element 30'). Once the metal sliding blade 33' is accurately installed at the bottom of the groove of the single-piece element 30', the reading head of the magnetic-card reader can be mounted on a dedicated location of the single-piece element (location 61 of FIG. 6*c*).

Throughout the present description of the proposed technique and in the associated figures, the first and second affixing portions of a metal sliding blade are represented as having appreciably similar shapes. This is also the case with the corresponding first and second blocking cavities of a magnetic-card reading single-piece element. Although such characteristics of the metal sliding blade and of the single-piece element are advantageous for reasons of simplicity of design and therefore of reduced costs, it is clear that the proposed technique is not limited to such an implementation. Thus, the first and second affixing portions of a metal sliding blade can equally well take very different shapes without departing from the framework of the present invention (this is also the case for the first and second blocking cavities of the magnetic-card reading single-piece element). Similarly, the mounting tool described with reference to FIG. 5 is an example given purely by way of an illustratory but non-exhaustive example of the proposed technique. Other shapes of mounting tools can thus be envisaged without departing from the framework of the present invention. In particular, the working extremity of the mounting tool can be shaped and sized so as to enable the implementing of means other than cooperation between the point of the tool and an orifice of the metal sliding blade to exert the pressure needed for the elastic deformation of the blade, with a view to mounting it. For example, when at least one affixing portion of the metal sliding blade takes the form of a double fold of one extremity of the blade, the elastic deformation of the blade can be obtained by exerting pressure at the angle formed between the free extremity and the junction portion of this affixing portion (the other affixing portion is besides already held in its blocking cavity). This angle (which corresponds for example to the folding axis referenced 212 in the example of FIGS. 2*a* and 2*b*) proves indeed to be a worthwhile point of application for exerting pressure in order to obtain the elastic deformation of the metal sliding blade: it is situated in the vicinity of the extremity of the blade (hence the pressure to be exerted is smaller), and it enables support without slippage (or at least with limited risks of slippage) for the mounting tool adapted to such an implementation; In such a case, it is then no longer necessary to provide for an orifice in the metal sliding blade.

The invention claimed is:

1. An electronic payment terminal comprising:
   an upper half-shell;
   a lower half-shell, said lower half-shell comprising a magnetic-card-reading single-piece element, said single-piece element comprising:
      a groove for movement of a magnetic card so as to enable the reading of a magnetic stripe of the magnetic card; and
   a metal sliding blade affixed at a bottom of said groove for movement of the magnetic card, said bottom comprising a recess within which said metal blade is fixed, and wherein the metal sliding blade is oriented to provide a stable support surface against which an edge of the magnetic card slides along the bottom of the groove.

2. The electronic payment terminal according to claim 1, wherein said metal sliding blade comprises a first affixing portion situated at one extremity of the blade, a second affixing portion situated at the other extremity of the blade and a substantially planar, central sliding portion situated between said first and second affixing portions.

3. The electronic payment terminal according to claim 2, wherein said recess comprises, at the bottom of said groove, a first blocking cavity having a shape complementary to that of said first affixing portion of the metal sliding blade and a second blocking cavity having a shape complementary to that of said second affixing portion of the metal sliding blade.

4. The electronic payment terminal according to claim 2, wherein at least one of said first and second affixing portions of the metal sliding blade takes the form of a double folding of one extremity of said blade.

5. The electronic payment terminal according to claim 4, wherein said double folding of one extremity of the metal sliding blade comprises a first folding of the blade by an angle substantially equal to 45°, and a second folding of the blade by an angle substantially equal to 45° in a direction opposite that of the direction of said first folding.

6. A method comprising:
   mounting a metal sliding blade at a bottom of a magnetic-card movement groove of a magnetic-card reading single-piece element of an electronic payment terminal, the electronic payment terminal comprising an upper half-shell and a lower half-shell, which comprises the magnetic-card-reading single-piece element, said metal sliding blade comprising a first affixing portion situated at one extremity of the blade, a second affixing portion situated at the other extremity of the blade and a substantially planar, central sliding portion situated between said first and second affixing portions, said mounting comprising:
   introducing said first affixing portion of the metal sliding blade into a first blocking cavity of said magnetic-card reading single-piece element;
   exerting pressure on said blade by using a tool for mounting the blade so as to reduce a distance between said first and second affixing portions by elastic deformation of the blade;
   introducing said second affixing portion of the elastically deformed metal sliding blade into a second blocking cavity of said magnetic-card reading single-piece element by means of said mounting tool; and
   relaxing said exerted pressure, leading to blocking of said second affixing portion in said second blocking cavity.

7. The method mounting according to claim 6, wherein said metal sliding blade comprises an orifice, and the mounting tool comprises a point at one of its extremities, capable of being inserted into said orifice.

8. The method of mounting according to claim 7, wherein said point extends perpendicularly to a first plane surface situated at said extremity of the mounting tool, at a boundary of a junction zone between said first plane surface and a second plane surface also situated at said extremity of the mounting tool, said first and second plane surfaces forming an angle between them of 135° to 170°.

9. The method of mounting according to claim 7, wherein said point is chamfered at its free extremity.

10. The method of mounting according to claim 6, further comprising, subsequently to the mounting of the metal sliding blade into the bottom of the magnetic card movement groove, mounting a magnetic-card reading head within said groove.

* * * * *